United States Patent [19]
Weber et al.

[11] Patent Number: 6,047,607
[45] Date of Patent: Apr. 11, 2000

[54] TRANSMISSION GEAR WHEEL WITH DAMPING CAPABILITY

[75] Inventors: Günter Weber, D. Kaltenbrunn; Heinrich Samitsch, Graz; Eduard Mohorko, Hausmannstätten, all of Austria

[73] Assignee: Bayerische Motoren Werke Aktiengesellschaft, Munich, Germany

[21] Appl. No.: 09/083,204

[22] Filed: May 22, 1998

[30] Foreign Application Priority Data

May 26, 1997 [DE] Germany .............................. 197 21 851

[51] Int. Cl.[7] .................................................... F16H 55/18
[52] U.S. Cl. .................................. 74/409; 74/440; 74/445
[58] Field of Search ............................ 74/409, 440, 443, 74/445

[56] References Cited

U.S. PATENT DOCUMENTS

| | | | |
|---|---|---|---|
| 1,746,178 | 2/1930 | Alexandrescu . | |
| 3,385,126 | 5/1968 | Finch | 74/440 |
| 4,033,198 | 7/1977 | Seragnoli | 74/443 |
| 4,140,026 | 2/1979 | Rouverol | 74/441 |

FOREIGN PATENT DOCUMENTS

| | | | |
|---|---|---|---|
| 719166 | of 1931 | France . | |
| 24 39 317 | of 1974 | Germany . | |
| 74 00 276 | of 1974 | Germany . | |
| 31 09 153 A1 | 3/1982 | Germany . | |
| 39 34 377 A1 | 5/1990 | Germany . | |
| 54-133263 | 10/1979 | Japan | 74/409 |
| 61-218867 | 9/1986 | Japan . | |
| 63-231064 | 9/1988 | Japan . | |
| 01288664 | 11/1989 | Japan . | |
| 4-191554 | 7/1992 | Japan | 74/440 |
| 8-014364 | 1/1996 | Japan . | |
| 256254 | of 1925 | United Kingdom . | |
| 2 214 606 | 9/1989 | United Kingdom . | |
| 2 224 805 | 5/1990 | United Kingdom | 74/440 |
| 2 275 318 | 8/1994 | United Kingdom | 74/409 |

*Primary Examiner*—David A. Bucci
*Assistant Examiner*—William C Joyce
*Attorney, Agent, or Firm*—Evenson McKeown Edwards & Lenahan P.L.L.C.

[57] ABSTRACT

A transmission gear wheel has at least two gear wheel elements which are provided with teeth on their circumference and which, coaxially and non-displaceably with respect to one another in the circumferential direction. Mutually offset teeth connect the elements with one another such that, for the engagement of a meshing gear wheel, the existing tooth flank play is reduced or discontinued. At least the teeth of one gear wheel element are constructed such with respect to their elasticity that, during the engagement of meshing gear wheel, at least starting at a defined transmitted torque, the offset in the circumferential direction of the tooth transmitting this torque is at least partially discontinued with respect to the tooth of the other gear wheel element by means of a deformation.

19 Claims, 2 Drawing Sheets

TRANSMISSION GEAR WHEEL WITH DAMPING CAPABILITY

BACKGROUND AND SUMMARY OF THE INVENTION

The present invention relates to a transmission gear wheel, and more particularly, a transmission gear wheel comprising two gear wheel elements provided with teeth on a circumference thereof and which, coaxially and non-displaceably with respect to one another in a circumferential direction and by way of mutually offset teeth are operatively connected such that, for engagement of a meshing gear wheel, existing tooth flank play is one of reduced and discontinued.

A conventional method for reducing the tooth flank play in the case of meshing gear wheels to construct one gear wheel such that tooth flanks of one line of teeth engage with the meshing gear wheel in short succession. For this purpose, one wheel of a pair of mutually meshing gear wheels consists of two gear rings of which one takes over the torque transmission and the other takes over the compensation of the play and which are prestressed with respect to one another in the circumferential direction by a spring as described in German Registered Utility Model 74 00 276.

Furthermore, U.S. Pat. No. 1,746,178 describes a gear wheel with two toothed disks of the same toothing which are arranged slightly offset with respect to one another. Both toothed disks are adjustably but fixedly connected with one another. This gear wheel is used for permitting the adjustment of the tooth flank play with the meshing gear wheel by an offsetting of the two gear disks with respect to one another. In this manner, for example, wear can be compensated by adjusting the toothed disks.

An object of the present invention is to provide a gear wheel made of two gear wheel elements which are firmly connected with one another while additionally, independently of wear, damping the noise generated during the interaction of meshing gear wheels.

According to the present invention, the foregoing object has been achieved by providing that at least the teeth of one of the gear wheel elements are deformable due to a selected elasticity such that, during the engagement of the meshing gear wheel, at least starting at a defined transmitted torque, an offset in the circumferential direction of a torque transmitting tooth is at least partially discontinued with respect to a corresponding tooth of the other gear wheel elements via a deformation.

The teeth of at least one gear wheel element, with respect to their elasticity, are such that, during the engagement of the meshing gear wheel (at least starting at a defined transmitted torque), offsetting in the circumferential direction of the tooth transmitting this torque with respect to the tooth of the other gear wheel element is at least partially discontinued.

This implementation advantageously results in a very good reduction of noise which prevents a so-called gear wheel clattering. In addition, the originally existing tooth flank play is reestablished under load, and both gear wheel elements are advantageously used for the torque transmission with the meshing gear wheel although they are fixedly and non-displaceably in a mutually offset manner connected with one another.

The present invention has a number of advantages. First, at least one gear wheel element is made of metal and/or a sintered material, the resistance to wear will be good. Second, if the two gear wheel elements have the same tooth shape, they can easily be manufactured together. If, during their mounting, these elements are then offset with respect to one another on the reference diameter by approximately $\frac{1}{10}$ mm coaxially and nondisplaceably with respect to one another in the circumferential direction, the noise generated during the meshing with the engaging gear wheel is optimally reduced.

It is further advantageous for the engagement with the meshing gear wheel for both gear wheel elements to have the same outside diameter and for the gear wheel element with the deforming teeth to have a smaller root diameter This is also advantageous for the forces occurring during the deformation and with respect to the wear.

The present invention provides easy manufacturability of the gear wheel element with the deforming teeth and the above-mentioned characteristics if, centrally in the tooth spaces, the element has notches in the radial direction corresponding to the spacing of the teeth The gear wheel of the present invention can be manufactured at reasonable cost if it is constructed as a plane toothed disk. The manufacture of such a toothed disk of a metal sheet made spring steel is, in turn, favorable for the force ratio and wear during torque transmission.

The firm connection between the two gear wheel elements can be established in a simple manner by screws. For reasons of space in the transmission housing, the present invention provides further advantages by constructing the gear wheel element with the deforming teeth to be constructed as a toothed disk which is indented in a plate shape. As viewed in the axial direction, the root circle and the tip circle of the teeth will then be offset with respect to one another. This offset characteristic also has an advantageous effect on the power transmission.

Other objects, advantages and novel features of the present invention will become apparent from the following detailed description of the invention when considered in conjunction with the accompanying drawings.

DETAILED DESCRIPTION OF THE DRAWINGS

Figure 1:
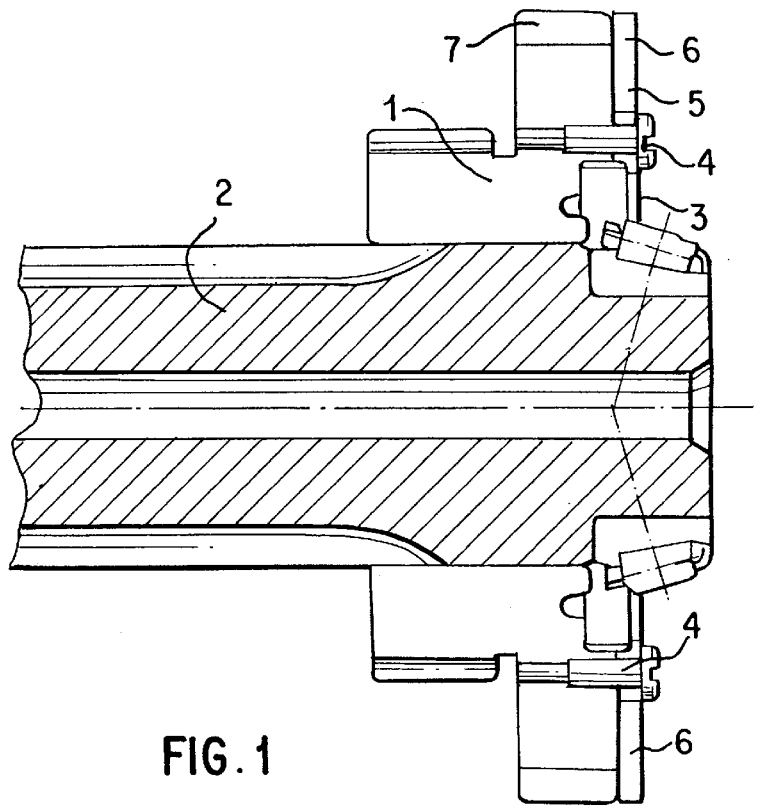
FIG. 1 is a partial view of a countershaft with a transmission gear wheel corresponding to the present invention, with the gear wheel element with the deforming teeth being constructed as a plane toothed disk.
Figure 2:
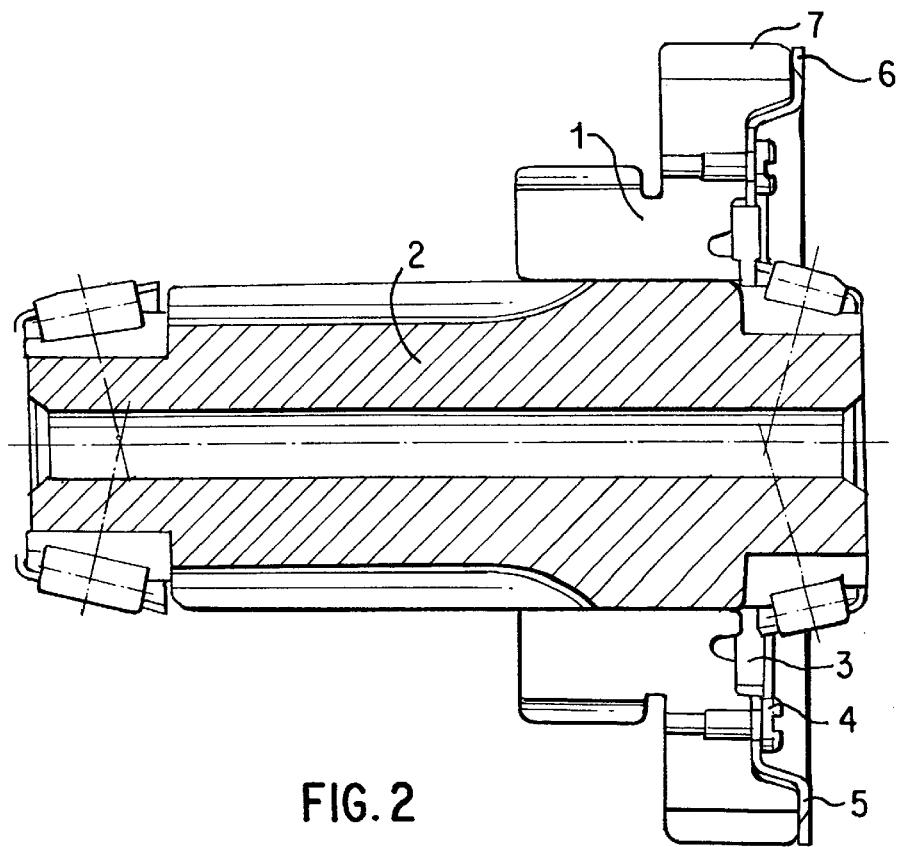
FIG. 2 is a similar view of another embodiment of a countershaft arrangement in which the gear wheel element with the deforming teeth being constructed as a toothed disk indented in a plate shape.

According to FIG. 1, a transmission gear wheel of a countershaft 2 includes two gear wheel elements, i.e. one gear wheel element in the form of a toothed disk 3 is firmly connected by screws 4 with another gear wheel element 1. The toothed disk 3 (FIG. 4) is a metal sheet made of spring steel with a tooth profile congruent with that of the other gear wheel element 1. The toothed disk 3 is constructed either as a plane (FIG. 1) or indented in a plate shape (FIG. 2). Corresponding to the spacing of the teeth, the toothed disk 3 has deep notches 5 and is slightly offset in the circumferential direction with respect to the other gear wheel element 1. As a result, during the meshing with the engaging opposite gear wheel, which is not shown for clarity of illustration, the individual teeth 6 of the toothed disk 3 can bend slightly until their tooth flanks are congruent with those of the teeth 7 of the other gear wheel element 1. A noise reduction thus results without any significant wear on the other gear wheel element 1 or on the toothed disk or on the opposite gear wheel.

Figure 3:
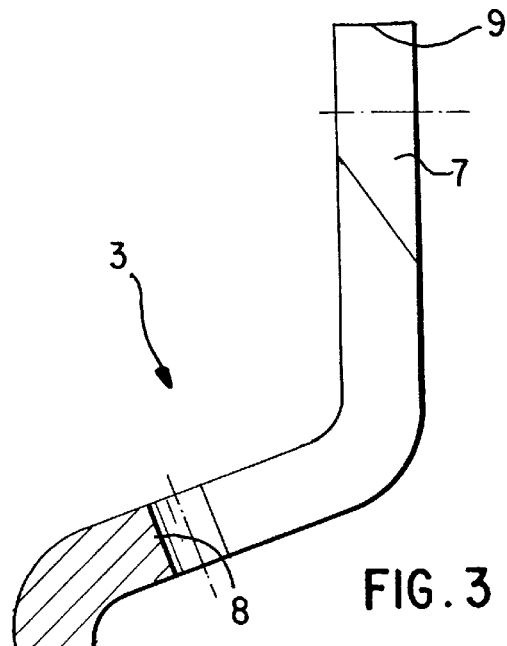
FIG. 3 is an enlarged partial sectional view of a toothed disk indented in a plate shape.

FIG. 3 shows the toothed disk 3 in the area of the teeth 7, i.e., the toothed disk 3 of FIG. 2 which is indented in a plate-shaped manner. The root circle 8 and the tip circle 9 of the teeth 7 are offset with respect to one another as viewed in the axial direction. A bore 10 is used for a screwed connection with the other gear wheel element 1 by way of the screws 4. The centering of the toothed disk 3 on the other gear wheel element 1 is taken over by the interior surface 11 of a center bore 12 in the toothed disk 3.

Figure 4:
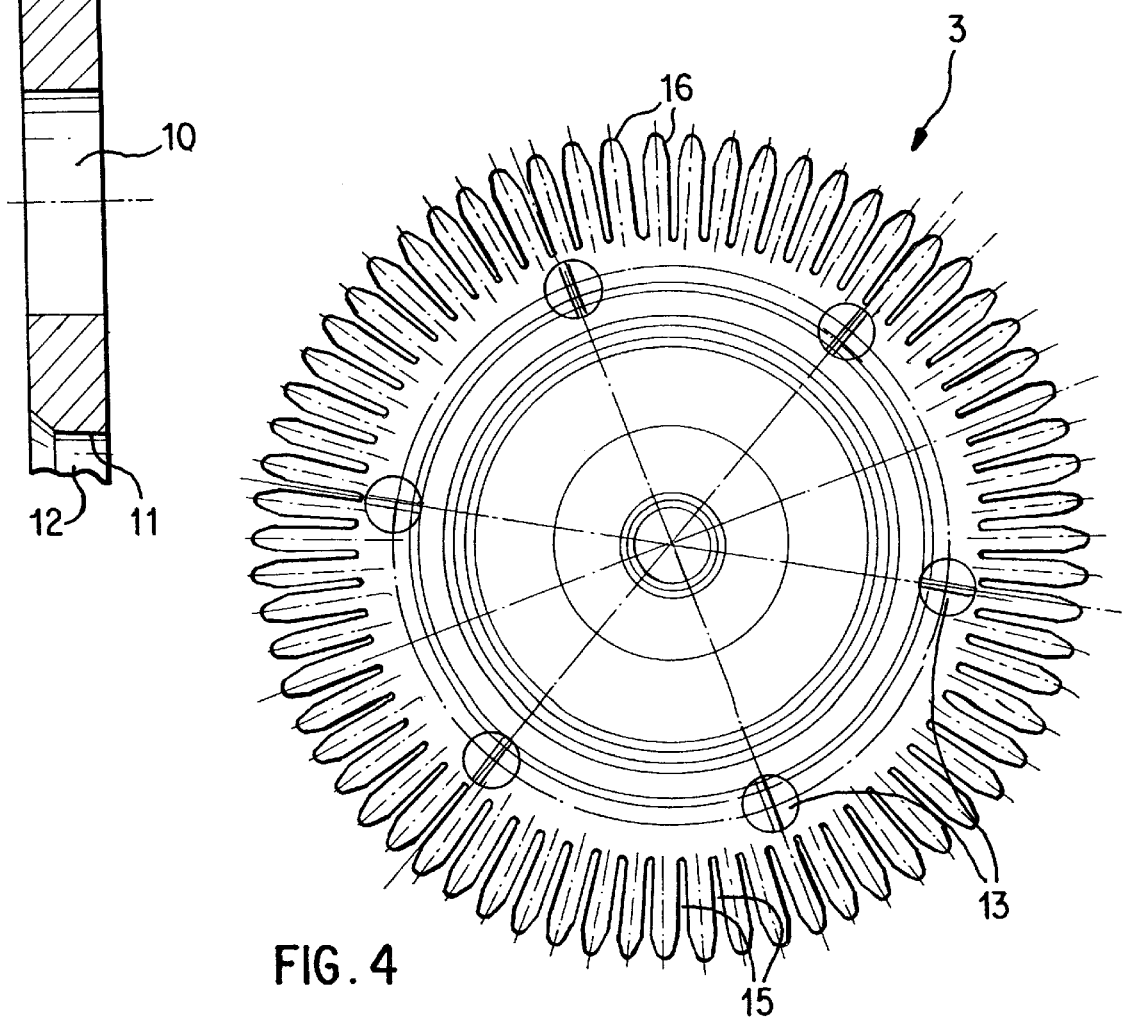
FIG. 4 is a top view of the plane toothed disk in accordance with the present invention.

FIG. 4 shows the toothed disk 3 of FIG. 1, connected with the other gear wheel element 1 situated therebehind and having teeth with substantially the same shape as the toothed disk 3, thus not being visible in the figure. The heads 13 of the screws 4 are visible, and connect the toothed disk 3 in a firm manner with the other gear wheel element 1. Also shown by way of the line thickness is the offset of the tooth flanks 16 of the toothed disk 3 and the other gear wheel element 1 in the circumferential direction clockwise by approximately 1/10 mm on the reference diameter. The toothed disk 3 is notched deeper in the radial direction in the center in the tooth spaces corresponding to the spacing of the teeth than the other gear wheel element. This feature is illustrated here at the notches 15 which reach into the proximity of the heads 13 of the fastening screws 4.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Transmission gear wheel, comprising coaxial gear wheel elements provided with corresponding teeth on a circumference thereof and being rotationally fixed relative to each other, wherein the teeth of at least one of the gear wheel elements are offset in a circumferential direction with respect to corresponding teeth of another of the gear wheel elements and are deformable due to a selected elasticity such that, during engagement of the transmission gear wheel, at least starting at a defined transmitted torque, the offset is reduced, and the at least one gear wheel element has a root circle in a first plane and a tip circle of the deformable teeth in a second plane axially spaced from the first plane.

2. The transmission gear wheel according to claim 1, wherein at least one of the gear wheel elements comprises metallic material.

3. The transmission gear wheel according to claim 1, wherein the gear wheel elements have the same tip circle diameter.

4. The transmission gear wheel according to claim 3, wherein at least one of the gear wheel elements comprises metallic material.

5. The transmission gear wheel according to claim 1, wherein the at least one gear wheel element with the deformable teeth has a smaller root circle diameter than another of the gear wheel elements.

6. The transmission gear wheel according to claim 5, wherein the gear wheel elements have substantially the same tooth shape.

7. The transmission gear wheel according to claim 6, wherein the gear wheel elements have the same tip circle diameter.

8. The transmission gear wheel according to claim 1, wherein the gear wheel element with the deformable teeth has radially-directed notches between the teeth.

9. The transmission gear wheel according to claim 1, wherein the gear wheel elements are mutually offset on a reference diameter in a circumferential direction by approximately 0.1 mm.

10. The transmission gear wheel according to claim 1, wherein that the at least one gear wheel element with the deformable teeth is indented in a plate shape.

11. The transmission gear wheel according to claim 10, wherein screws are provided to fasten the at least one gear element on another of the gear wheel elements.

12. The transmission gear wheel according to claim 11, wherein the gear wheel elements have the same tip circle diameter.

13. The transmission gear wheel according to claim 12, wherein the at least one gear wheel element with the deformable teeth has a smaller root circle diameter than another of the gear wheel elements.

14. The transmission gear wheel according to claim 10, wherein the at least one gear wheel element is formed from a spring sheet metal.

15. The transmission gear wheel according to claim 14, wherein the gear wheel elements have the same tip circle diameter.

16. The transmission gear wheel according to claim 15, wherein the at least one gear wheel element with the deformable teeth has a smaller root circle diameter than another of the gear wheel elements.

17. The transmission gear wheel according to claim 16, wherein the gear wheel elements have substantially the same tooth shape.

18. The transmission gear wheel according to claim 17, wherein the gear wheel element with the deformable teeth has radially-directed notches between the teeth.

19. The transmission gear wheel according to claim 18, wherein the gear wheel elements are mutually offset on a reference diameter in a circumferential direction by approximately 0.1 mm.

* * * * *